(12) United States Patent
Copus

(10) Patent No.: US 9,056,620 B2
(45) Date of Patent: Jun. 16, 2015

(54) MATERIAL HANDLING AND LOAD CONVEYANCE SYSTEM

(71) Applicant: Gary D. Copus, Carmichael, CA (US)

(72) Inventor: Gary D. Copus, Carmichael, CA (US)

( * ) Notice: Subject to any disclaimer, the term of this patent is extended or adjusted under 35 U.S.C. 154(b) by 0 days.

(21) Appl. No.: 14/099,198

(22) Filed: Dec. 6, 2013

(65) Prior Publication Data

US 2014/0159326 A1    Jun. 12, 2014

Related U.S. Application Data

(60) Provisional application No. 61/734,334, filed on Dec. 6, 2012.

(51) Int. Cl.
| | |
|---|---|
| *B65G 7/04* | (2006.01) |
| *B62B 3/02* | (2006.01) |
| *B62B 3/00* | (2006.01) |
| *B65G 13/00* | (2006.01) |

(52) U.S. Cl.
CPC . *B62B 3/02* (2013.01); *B62B 3/009* (2013.01); *B65G 13/00* (2013.01); *B65G 7/04* (2013.01); *B62B 3/008* (2013.01); *B62B 2301/254* (2013.01); *B62B 2301/256* (2013.01)

(58) Field of Classification Search
CPC .................................. B65G 7/04; B65G 13/00
USPC ........... 280/28.5, 5.22; 193/37; 198/838, 779, 198/852
See application file for complete search history.

(56) References Cited

U.S. PATENT DOCUMENTS

| | | | | |
|---|---|---|---|---|
| 61,344 | A | * | 1/1867 | Lake .......................... 280/28.5 |
| 219,938 | A | * | 9/1879 | Halcombe ................ 280/28.5 |
| 2,468,055 | A | * | 4/1949 | Gibler ......................... 414/528 |
| 2,744,758 | A | * | 5/1956 | Stokvis et al. .................. 305/60 |
| 3,416,645 | A | * | 12/1968 | Jones .......................... 198/833 |
| 3,529,688 | A | * | 9/1970 | Bruce ......................... 180/9.23 |
| 4,062,418 | A | * | 12/1977 | Misawa ........................ 180/8.2 |
| 4,358,010 | A | * | 11/1982 | Besch .......................... 198/838 |
| 5,217,103 | A | * | 6/1993 | Umlauf ...................... 198/890.1 |
| 5,538,384 | A | * | 7/1996 | Haldimann ................. 414/286 |
| 5,878,805 | A | * | 3/1999 | Witschi et al. ............... 164/430 |
| 5,921,368 | A | * | 7/1999 | Zaguroli, Jr. .................. 193/2 D |
| 6,648,128 | B2 | * | 11/2003 | Yamashita et al. ............ 198/779 |
| 7,125,082 | B2 | | 10/2006 | Copus |
| 7,810,656 | B2 | * | 10/2010 | Lewis et al. .................... 211/151 |
| 7,850,562 | B2 | * | 12/2010 | DeGroot ...................... 474/153 |
| 8,162,133 | B2 | * | 4/2012 | Ruge ............................ 198/779 |
| 8,286,787 | B2 | * | 10/2012 | Davi et al. ..................... 198/851 |
| 8,464,862 | B2 | * | 6/2013 | Honeycutt et al. ............ 198/822 |
| 2008/0164124 | A1 | * | 7/2008 | Reist et al. .................... 198/779 |
| 2012/0132501 | A1 | * | 5/2012 | Reist ............................. 198/416 |
| 2013/0033013 | A1 | * | 2/2013 | Voisine ....................... 280/28.5 |
| 2013/0056942 | A1 | * | 3/2013 | Maratta ....................... 280/28.5 |
| 2013/0062153 | A1 | * | 3/2013 | Ben-Tzvi et al. ............... 192/71 |

* cited by examiner

*Primary Examiner* — Joseph Rocca
*Assistant Examiner* — Gabriela C Craciun
(74) *Attorney, Agent, or Firm* — Craig M. Stainbrook; Stainbrook & Stainbrook, LLP

(57) ABSTRACT

A multipurpose loading and unloading and/or material handling and moving apparatus including a closed chain continuous roller grid disposed on and around a continuous elongate table, the roller grid comprising a plurality of parallel axles pivotally coupled at their ends by parallel first and second sets of independent mechanical links.

10 Claims, 6 Drawing Sheets

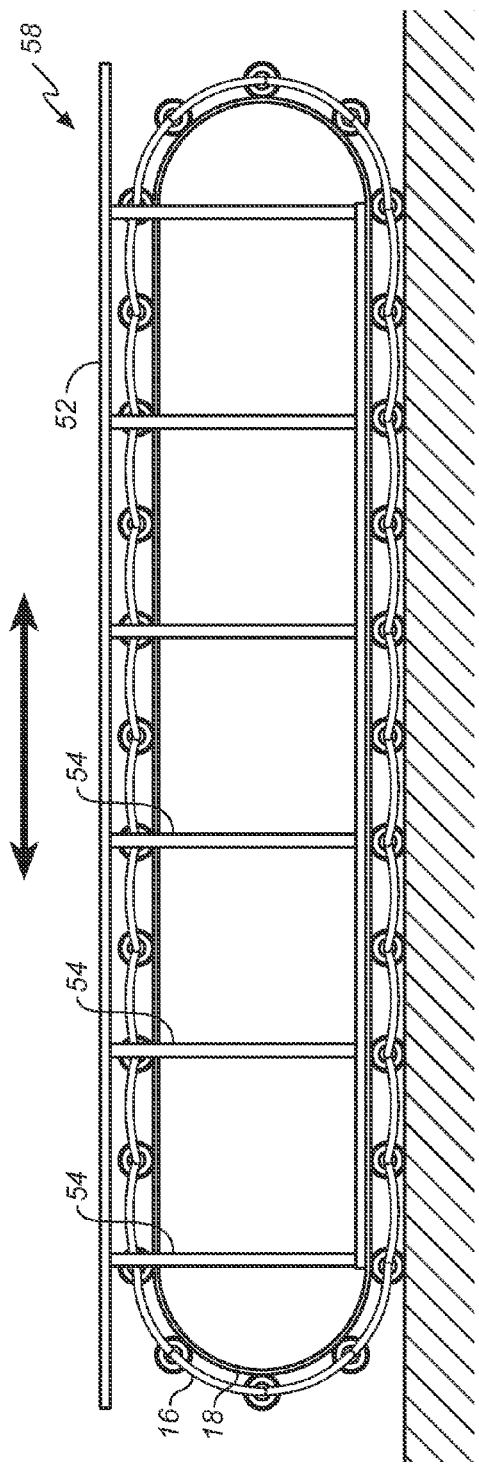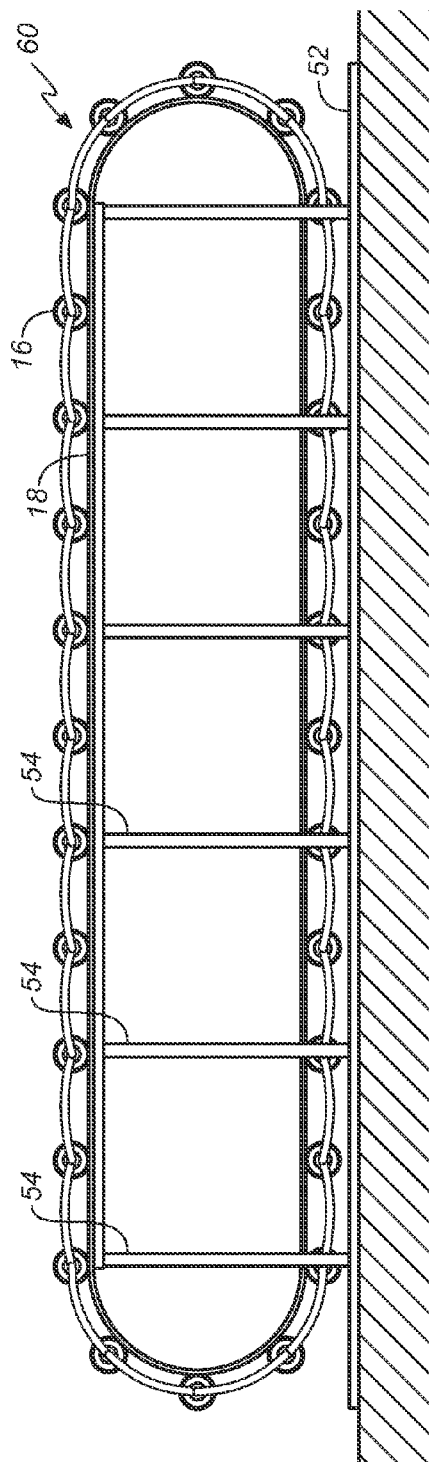
FIG. 3A
FIG. 3B

MATERIAL HANDLING AND LOAD CONVEYANCE SYSTEM

CROSS REFERENCES TO RELATED APPLICATIONS

The present application claims the benefit of the filing date of U.S. Provisional Patent Application Ser. No. 61/734,334, filed Dec. 6, 2012 (Dec. 6, 2012).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

Field of the Invention

The present invention relates to material motion and conveyance systems, and more particularly to improvements in conveyance systems using a roller grid-type technology (such as is taught in U.S. Pat. No. 7,125,082).

BRIEF SUMMARY OF THE INVENTION

The present invention is a multipurpose loading and unloading and/or material handling and moving apparatus that includes a continuous track roller assembly comprising a plurality of parallel axles pivotally coupled at their ends by first and second sets of independent mechanical links. The first and second sets of mechanical links are also oriented generally parallel to one another.

Disposed over each axle is a fixed inner roller captured between the ends of mechanical links by a fastener/spacer assembly. Coaxially disposed over the inner roller is a tubular outer roller, which has an inner diameter slightly larger than the outer diameter of the inner roller, preferably with the inner roller outer diameter ranging approximately from two thirds to three fourths the diameter of the inner diameter of the outer roller.

This assembly is essentially a closed chain structure similar in design to the continuous track or tracks on a bulldozer or a tank, sometimes referred to as a tank tread or caterpillar track, and forms a continuous roller assembly having the geometry of a closed grid. The grid is continuous and is disposed around and engages an elongate roller deck having spaced-apart parallel top and bottom sides joined at each of their respective ends with a semicircular bridge. The articulating mechanical links permit the parallel rollers to translate linearly across the top and bottom surfaces of the roller deck as well as around the semicircular bridged ends.

A load-bearing deck is connected to and disposed either above or below the closed chain continuous track roller grid for supporting a load. When disposed below the roller grid, the load-bearing deck may engage the ground, and therefore supports a generally stationary roller deck and roller grid, which then function as a roller conveyor. Alternatively, the load-bearing deck may be disposed above the roller grid and roller deck, in which event the roller grid engages the ground and the entire assembly may be rolled across a surface, such as a floor. In this implementation, the apparatus functions as rolling material handling table.

The system preferably does not include bearings of any kind. Indeed, a principal advantage of this system is that it employs inexpensive and readily available structural and operational elements to provide a number of roller assemblies that bear extremely heavy loads without the need for expensive wheel bearing sets. This is accomplished through extremely broad load distribution over the entire width of the tubes and cylinders engaged by the load. Wheel bearings are typically small, and each bearing in a wheel set will, at least momentarily, bear a substantial portion of an overall load. By contrast, the cylinders comprising the rollers of the present invention distribute a heavy load over multiple segments, all of which are relatively robust—particularly relative to the small metal spheres comprising ball bearings.

Even so, rollers disposed in low friction rolling bearing sets (e.g., race bearing sets) could be employed as the element that translates across the roller deck. Furthermore, the articulating mechanical links could be replaced by a conventional roller chain connecting the axles of the roller sets. In this embodiment, movement of the roller grid could be accomplished using a motor with a sprocket gear on a drive shaft operatively coupled to the drive chain, in a manner well known.

In a preferred embodiment, level adjustment means, such as air jacks or screw jacks, may be disposed under each end so as to provide a way to either make the entire system level from end to end, or alternatively to vary the level so that translation of loads may be facilitated through the use of gravity.

Even a small assembly suitable for use by an individual can bear loads measured in the tons.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Before explaining the preferred embodiment of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways. Further, it is to be understood that the terminology and phraseology employed herein are for descriptive purposes only, and not limitation. Where specific dimensional and material specifications have been included or omitted from the specification or the claims, or both, it is to be understood that the same are not to be incorporated into the appended claims.

As such, those skilled in the art will appreciate that the conception upon which this disclosure is based may readily be used as a basis for designing other structures, methods, and systems for carrying out the several purposes of the present invention. It is important, therefore, that the claims are regarded as including such equivalent constructions as far as they do not depart from the spirit and scope of the present invention. Rather, the fundamental aspects of the invention, along with the various features and structures that characterize the invention, are pointed out with particularity in the claims annexed to and forming a part of this disclosure. For a better understanding of the present invention, its advantages and the specific objects attained by its uses, reference should be made to the accompanying drawings and descriptive matter in which there are illustrated the preferred embodiment.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein:

FIG. 3A is a side view in elevation thereof;

FIG. 3B shows the apparatus of FIGS. 3 and 3A inverted into a stationary closed chain continuous track roller grid conveyor;

DETAILED DESCRIPTION OF THE INVENTION

Figure 1A:
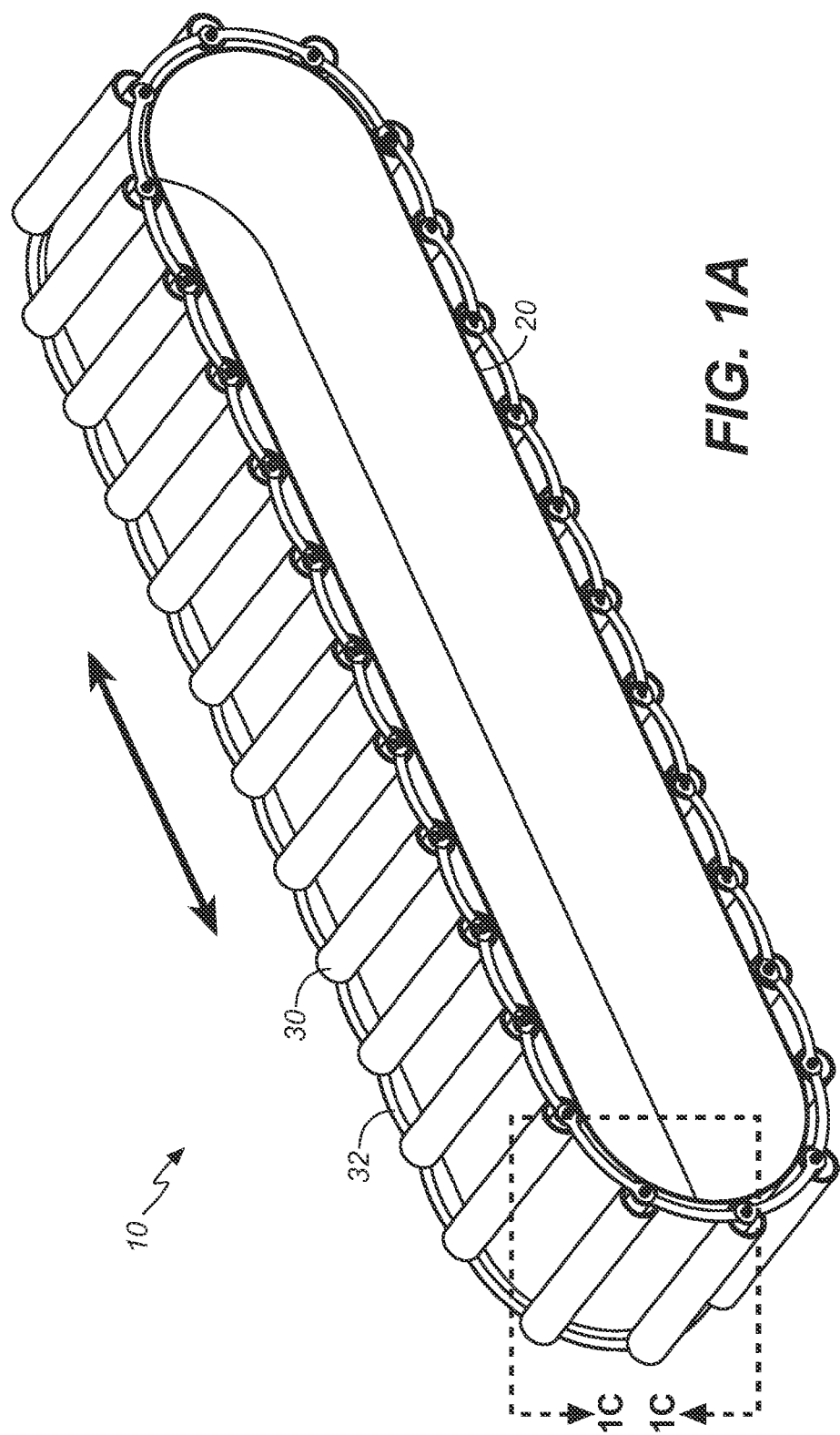
FIG. 1A is an upper perspective view of the material handling and load conveyance system of the present invention.
Figure 1B:
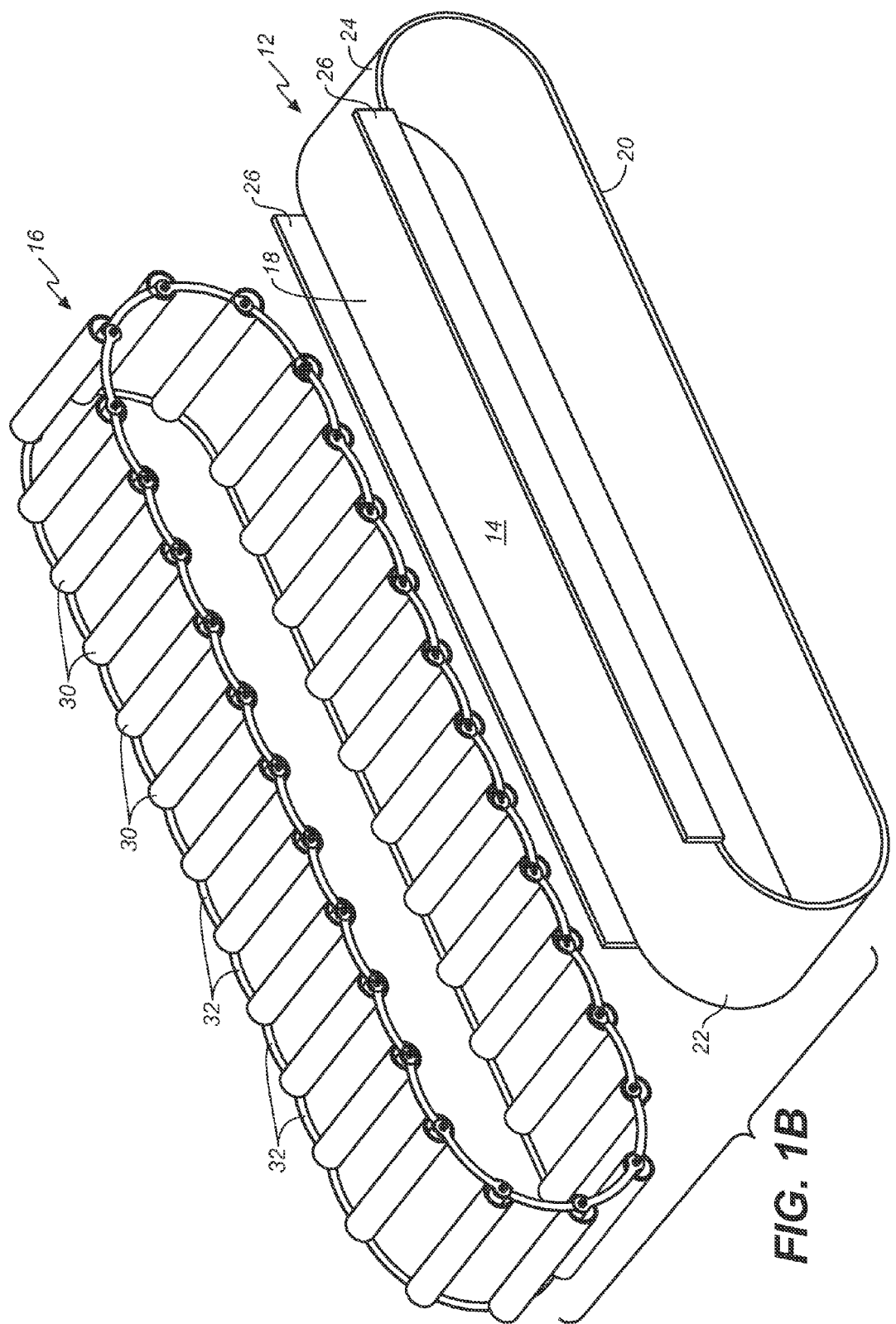
FIG. 1B is a partially exploded view showing the closed and continuous track roller conveyor separately from the load supporting deck.

Referring first to FIGS. 1A and 1B, wherein like reference numerals refer to like components in the various views, there is illustrated therein a new and improved material handling and conveyance system, generally denominated 10 herein. The system includes a continuous roller deck 12 with a smooth, contiguous and continuous exterior surface 14 and a closed chain continuous track roller grid 16 disposed around the roller deck and engaging substantially the entirety of its continuous exterior surface 14 as it moves or rolls smoothly along and around that surface. The roller deck includes parallel and generally planar upper and lower portions 18, 20, respectively, and first and second semicircular end portions 22, 24, respectively. Surprisingly, there appears to be no specific geometric term that summarily describes this common shape, though it may be roughly referred to as either oval or oblong, for convenience only and admittedly not technically precise. The views make clear, however, that when the apparatus is used on a substantially level floor (its recommended use), the upper and lower portions 18, 20, are generally parallel to the floor. Further, as seen in the views, the surface is not interrupted by any abrupt changes in the plane of the surface, such that the rollers, fully described below, move smoothly and easily across the continuous surface. The first and second semicircular end portions 22, 24 diverge from the flat plane of the upper and lower portions 18, 20 gently and with dimensions closely conformed to the dimensions of the continuous track (also described fully below) so as to ensure smooth movement of the rollers across the continuous exterior surface. The top portion 18 of the roller deck or both the top and bottom portions may include guide rails 26 to keep the continuous track roller grid tracking properly along the exterior surface.

The closed chain continuous track roller grid 16 includes a plurality of roller assemblies 30 disposed generally parallel with one another, with each roller assembly pivotally connected to adjacent roller assemblies through articulating mechanical links 32.

Figure 1C:
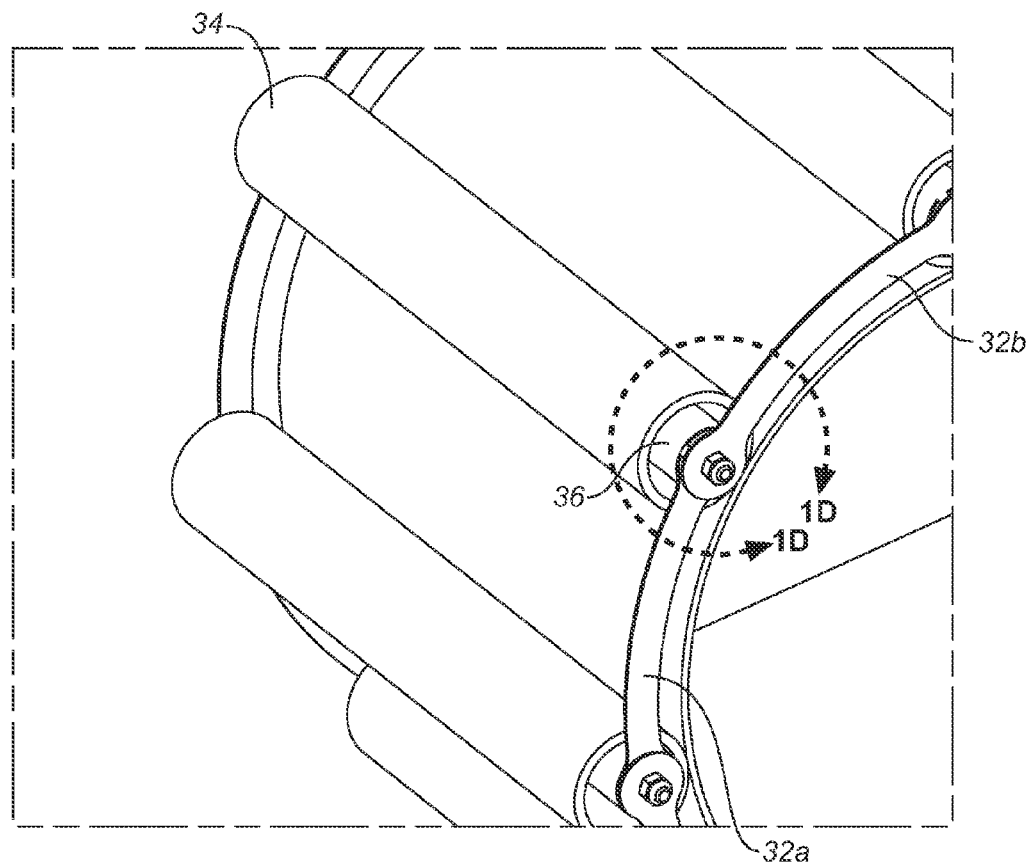
FIG. 1C is a detailed perspective view taken along section line 1C-1C of FIG. 1.
Figure 1D:
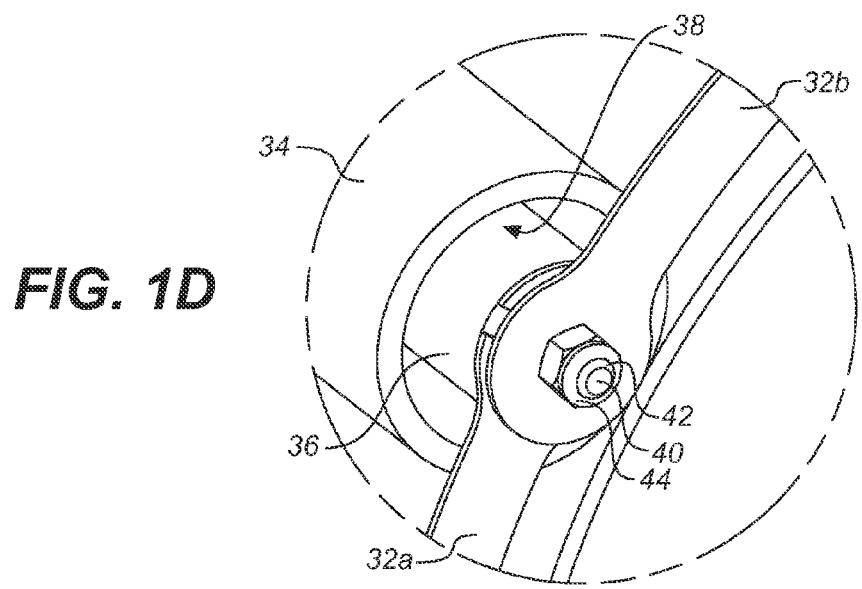
FIG. 1D is an increasingly detailed perspective view taken along line 1D-1D of FIG. 1C.

Turning next to FIGS. 1C and 1D, where details of the roller assemblies 30 and mechanical links 32 are shown, we see that each roller assembly 30 includes an outer roller 34 and an inner roller 36, the latter having an outer diameter smaller (approximately $2/3$ to $3/4$) than that of the inner diameter of the outer roller. Thus, there is a space or air gap 38 between the inner and outer rollers. The inner roller is coaxially disposed around a rod or axle 40 having threaded ends 42 onto which a nut 44 is disposed. Pivotally connected to each end of each axle are the ends of an inner link 32a and an outer link 32b, which are slightly spaced apart using a spacer or washer (not shown). The links are aptly denominated "bone links" because they bear a resemblance to a long bone, with each end corresponding to a proximal or distal epiphysis and the medial portion corresponding to a diaphysis. Each link may be slightly curved or bent with a radius slightly larger than the radius of the semicircular ends of the continuous table, the difference in radius corresponding to the increased radius as measured from a center common to the closed chain continuous track roller grid and the semicircular roller deck ends, using the axles as the measuring point.

As will be appreciated by those with skill in the art, the rollers can be retained within the edges of the roller deck either by the above-described rails 26, or the rollers themselves can be configured with an outer flange that engages the roller deck edge. This latter configuration is less desirable, inasmuch as the materials employed in the present invention might be vulnerable breakage from continuous movement and use, whereas passive structural rails might be prone to wear (depending on table material choice), but not breakage.

Figure 2:
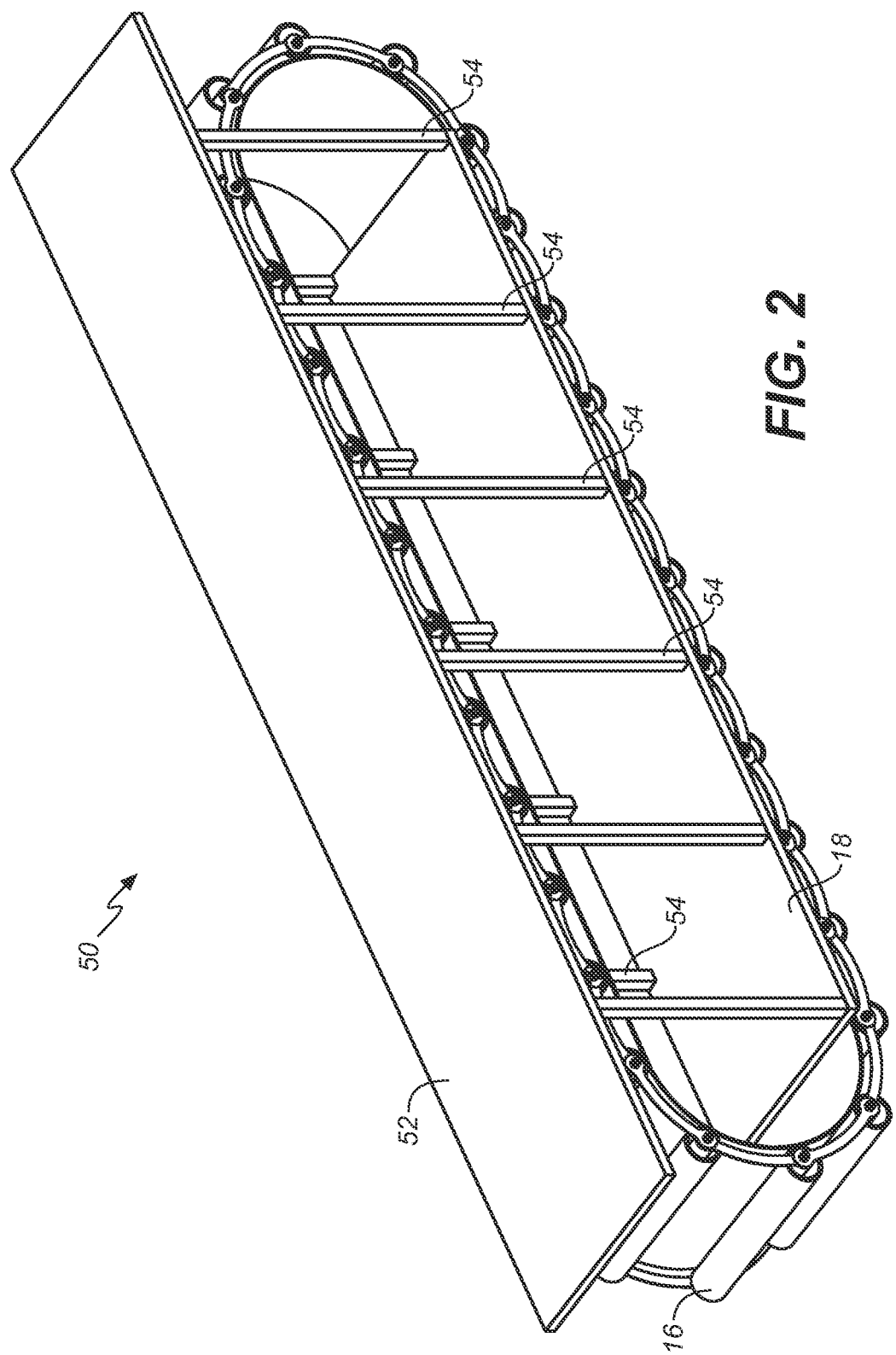
FIG. 2 is an upper perspective view showing the inventive system embodied in a continuous track load conveyor table.

Referring next to FIGS. 2 through 3B, there is shown a preferred embodiment 50 of the inventive material handling and conveyance system in which a load-bearing deck or platform 52 is installed on the continuous roller deck 18 using a plurality of legs or support posts 56. This embodiment can be used as a rolling table and material handler 58 (FIG. 3A) when the load-bearing deck or platform is elevated above the continuous track roller grid or as a stationary continuous track roller conveyor 60 (FIG. 3B).

Figure 4A:
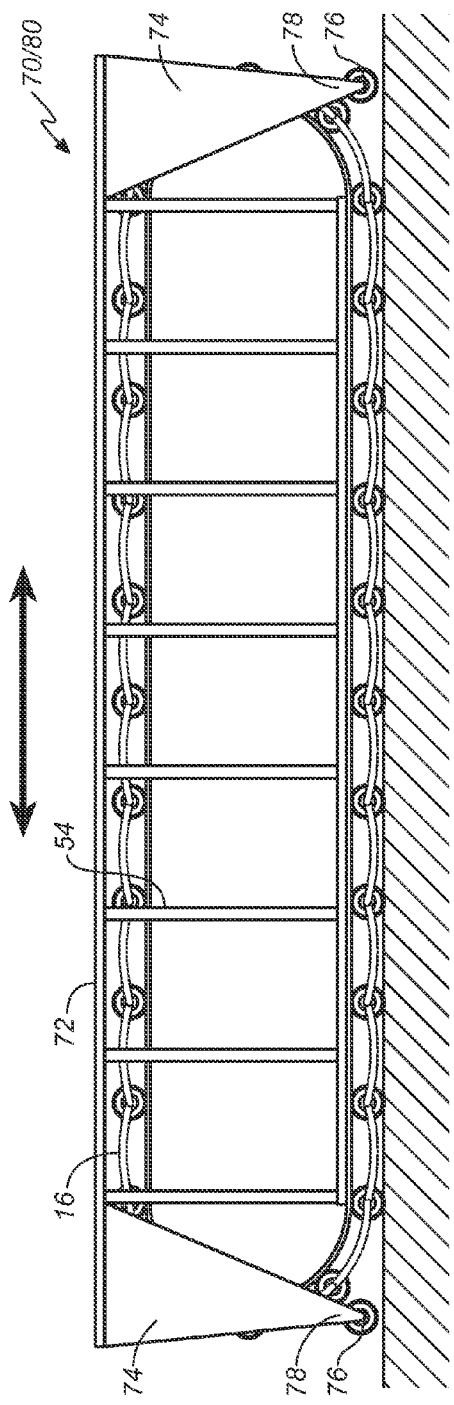
FIG. 4A is a side view in elevation showing a preferred embodiment of a continuous track load conveyor table with a roll out portion for loading and unloading materials.
Figure 4B:
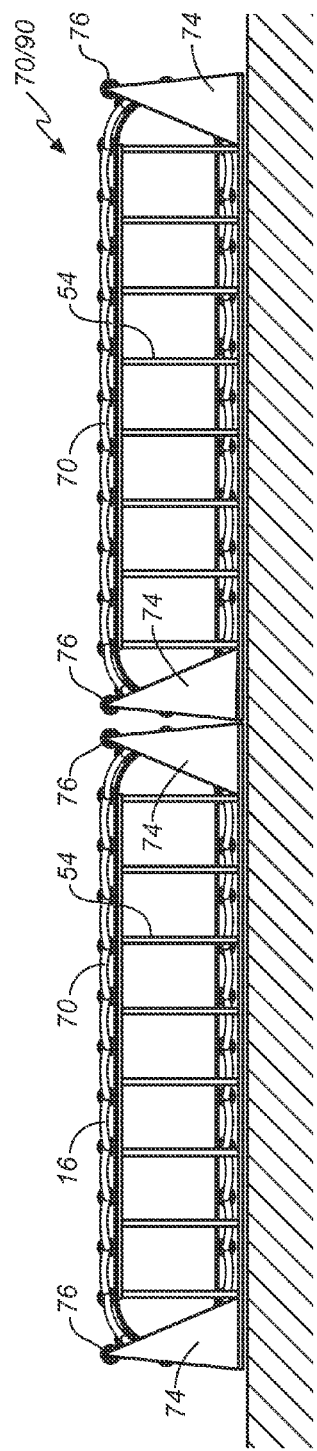
FIG. 4B is a side view in elevation showing two iterations of the embodiment of FIG. 4A inverted and joined end to end.

Referring, finally, to FIGS. 4A and 4B, there is shown another preferred embodiment 70, in which the elevated load-bearing deck or platform 72 of FIGS. 2-3B is provided with spaced-apart triangular end panels 74 disposed at each end of the load-bearing deck and having a single end roller 76 mounted between the vertices 78 of the panels at each end of the load-bearing deck. The end rollers 76 are spaced apart from the continuous track roller grid 16 and are slightly offset from (elevated above) the line of ground-engaging rollers. The end rollers do not touch the ground when this embodiment is employed as a continuous track rolling table 80 (FIG. 4A). When employed as a continuous track stationary roller conveyor 90 (FIG. 4B), the end rollers are slightly offset and slightly lower than the upper line of rollers. This facilitates load bearing at the load-bearing platform end when massive loads are placed on the platform, as well as end-to-end placement of identical units of the assembly so as to create a long stationary conveyor. And, as will be appreciated, the embodiment of FIG. 4A and that of 4B are simply inverted relative to one another.

From the foregoing, it will be seen that in its most essential aspect, the present invention is a continuous track roller conveyor that includes a continuous roller deck having a continuous exterior surface; a closed chain continuous track roller grid disposed around the continuous roller deck and engaging substantially the entirety of the continuous exterior surface; and a load-bearing deck coupled to the continuous roller deck for supporting a material load either above or below the roller deck and roller grid; wherein the closed chain continuous track roller grid includes a plurality of roller assemblies disposed generally parallel with one another, each of the roller assemblies being pivotally connected to adjacent roller assemblies through two closed chains of mechanical links. The roller assemblies are simple inner/outer tube combinations coaxially disposed over an axle, each end of which is connected to a closed chain of mechanical links.

The above disclosure is sufficient to enable one of ordinary skill in the art to practice the invention and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

For instance, the rollers employed for the roller assemblies may be slightly irregularly shaped. Further still, while coaxially disposed tubes are preferred because the combination is robust, inexpensive, and generally trouble free, rollers disposed in low friction roller bearing sets (whether they employ cylindrical, spherical, tapered, needle, or toroidal bearings) may be employed as the element that translates across the roller deck. The particular bearing selection being dictated by the kinds of load-bearing contemplated.

Further, the connection of the roller axles may be provided by a roller chain, rather than the above-described articulating mechanical links (the "bone links"). In this way, the roller sets may be operatively connected to a motor through a sprocket gear on the motor drive shaft.

Therefore, the above description and illustrations should not be construed as limiting the scope of the invention, which is defined by the appended claims.

What is claimed as invention is:

1. A material handling and load conveying system, comprising:
    a continuous roller deck having a continuous exterior surface;
    a closed chain continuous track roller grid disposed around said continuous roller deck and engaging substantially the entirety of said continuous exterior surface; and
    a load-bearing deck disposed either above or below said closed chain continuous track roller grid for supporting a load;
    wherein said closed chain continuous track roller grid includes a plurality of roller assemblies disposed generally parallel with one another, each of said roller assemblies pivotally connected to adjacent roller assemblies through mechanical links; and
    wherein each of said roller assemblies includes an outer roller and an inner roller, said inner roller having an outer diameter smaller than that of the inner diameter of said outer roller, thus creating a space or air gap between said inner and outer roller.

2. The material handling and load conveying system of claim 1, wherein each of said inner rollers is coaxially disposed around an axle.

3. The material handling and load conveying system of claim 2, further including an inner link and an outer link pivotally connected to each end of each of said axles.

4. The material handling and load conveying system of claim 3, wherein each pair of said inner and outer links, pivotally connected to the same axle are slightly spaced apart using a spacer.

5. The material handling and load conveying system of claim 4, wherein each of said inner and outer links are curved with a radius slightly larger than a radius of a semicircular end of said continuous roller deck.

6. The material handling and load conveying system of claim 4, wherein a difference in radius between said inner and outer links and said continuous roller deck corresponds to an increased radius as measured from a center common to said closed chain continuous track roller grid and a semicircular end of said continuous roller deck, using the longitudinal axis of said axles as a measuring point.

7. The material handling and load conveying system of claim 2 wherein each of said axles have threaded ends on each of which a nut is disposed, and wherein said inner and outer links are spaced apart by a washer.

8. The material handling and load conveying system of claim 1, further including at least one pair of spaced-apart end panels disposed at an end of said load-bearing deck, said end panels having an end roller mounted between said end panels.

9. The material handling and load conveying system of claim 8, wherein said system is employed as a continuous track rolling table and said end rollers are spaced apart from said closed chain continuous track roller grid and slightly elevated above a line of rollers engaging said lower portion of said continuous roller deck.

10. The material handling and load conveying system of claim 8, wherein said system is employed as a continuous track stationary roller conveyor and said end rollers are disposed apart from and slightly below the line of rollers on said upper portion of said continuous roller deck.

* * * * *